Patented Apr. 17, 1928.

1,666,437

UNITED STATES PATENT OFFICE.

GUY H. BUCHANAN, OF WESTFIELD, AND JOHN L. OSBORNE, OF ELIZABETH, NEW JERSEY, ASSIGNORS TO AMERICAN CYANAMID COMPANY, OF NEW YORK, N. Y., A CORPORATION OF MAINE.

PROCESS OF MANUFACTURING FORMIC ACID.

No Drawing.   Application filed December 10, 1923.  Serial No. 679,822.

This invention relates to a method of manufacturing formic acid of high concentration and substantially free from impurities by employing as a raw material an alkali earth metal formate, and has for its object to provide a procedure for producing a nearly anhydrous formic acid in a manner less costly and more expeditiously than heretofore known.

With these and other objects in view the invention consists in the novel steps and combinations of steps constituting the process, all as will be more fully hereinafter disclosed and particularly pointed out in the claims.

As an example of the process we may employ 200 parts of a crude calcium formate containing approximately 60 parts of calcium formate and 40 parts of sodium chloride. The crude calcium formate of this composition is conveniently made by subjecting to temperatures and pressures higher than atmospheric, an aqueous solution of the crude cyanide compound containing calcium cyanide and sodium chloride, and produced from calcium cyanamide by the process described in U. S. Patent #1,359,257 to Walter S. Landis, and also filtering off any insoluble compounds that appear, and evaporating the solution to dryness. To the solid calcium formate compound thus obtained, we add 40 parts of formic acid to act as a diluent and aid in the uniform incorporation of the sulphuric acid, which is to be added subsequently to effect the decomposition of the formate and to generate the desired formic acid. Having thus produced the desired raw crude calcium formate mass we then stir the mixture while cooling the same, to ensure an equal distribution of the calcium formate produced in the mass. To this stirred mixture we add slowly and with constant stirring and cooling, an amount of strong 98% sulphuric acid just sufficient to react with the calcium formate present, but insufficient to react with any of the sodium chloride present in the mixture. We continue the mixing and cooling operations for from say 30 minutes to one hour to insure uniform mixing and reactions throughout the mass.

We now heat the mixture to distill off the formic acid produced and assist the distillation by the use of a reduced pressure. The vapors given off are passed into a condenser from which an acid containing over 90% formic acid is obtained.

An essential feature of the process is the proportioning of the sulphuric acid to the solid formate present in the stirred mass, for the amount to be added depends entirely upon the percentage of calcium formate produced and present in the crude mixture. By uniformly incorporating the sulphuric acid with the mass, however, and cooling to avoid any evolution of formic acid until all the sulphuric acid is completely utilized, we almost entirely avoid the liberation of any hydrochloric acid from the sodium chloride derived from the original crude calcium cyanide and now associated with the calcium formate operated upon. This absence of hydrochloric acid shows that the action of the sulphuric acid is confined almost exclusively to the calcium formate and that the sodium chloride present is substantially unattacked so long as any undecomposed calcium formate remains in the mixture.

According to the prior procedures when formic acid is produced from sodium formate great difficulty is experienced in making an acid of more than 90% strength, for a number of reasons. The first of these reasons is the fact that sodium formate is an extremely hygroscopic salt, and the moisture absorbed by it from the atmosphere is liberated during the generation of the acid and passes over with the formic acid and dilutes it. Calcium formate on the other hand is not hygroscopic and may be exposed to the atmosphere for any desired length of time without the absorption of water. The second reason for the low concentration of the acid heretofore produced from sodium formate is that there is a rapid evolution of heat when sulphuric acid and sodium formate are mixed. Therefore, wherever in the sodium formate mass local concentrations of sulphuric acid arise, some decomposition of the produced formic acid takes place with a resultant lowering of the yield and with a dilution of the formic acid formed by the water resulting from the decomposition.

This problem of carrying away the heat of reaction is specially serious when using sodium formate as a base material. But when alkaline earth metal formates are used the reaction is slower due probably to the coating of the particles by insoluble alkali earth metal sulphates, and there is practically no objectionable decomposition of the formic acid caused by local overheating. A third reason for the use of a base material of calcium formate instead of an alkali metal formate is that calcium sulphate retains one half molecule of water with great tenacity, and hence acts as a drying agent, absorbing any traces of water that may be produced during the reaction.

The above disclosed three properties or advantages carried by calcium formate over sodium formate as a base material doubtless explain the ease with which formic acid of high strength may be produced from calcium formate.

Formic acid is initially mixed as a diluent in the original dry calcium formate mixture because of the two fold facts that it enables us to secure the thorough mixing of the calcium formate produced with the sulphuric acid, and at the same time enables us to return to the process for redistillation, any formic acid containing hydrochloric acid resulting from the use of an excess of sulphuric acid in its generation, or any acid of low concentration which may be later concentrated by the dehydrating action of the calcium sulphate.

It is obvious that those skilled in the art may vary the details of the process without departing from the spirit of the invention, and therefore, we do not wish to be limited to the above disclosure except as may be required by the claims.

What we claim is:—

1. A method of producing formic acid which comprises adding formic acid to an alkali earth metal formate, treating the same with a non-volatile acid capable of decomposing the same, and boiling off the formic acid formed.

2. A method of producing formic acid which comprises adding formic acid to an alkali earth metal formate, treating the same with a non-volatile acid capable of decomposing the same, and boiling off the formic acid formed under reduced pressure.

3. A method of producing formic acid which comprises providing a mixture of an alkali earth metal formate containing a salt, treating the same with an amount of a non-volatile acid sufficient to decompose only the said formate, and boiling off the formic acid formed.

4. A method of producing formic acid which comprises providing a mixture of an alkali earth metal formate containing a salt, adding formic acid thereto, treating the same with an amount of a non-volatile acid sufficient to decompose only the said formate, and boiling off the formic acid formed.

5. A method of producing formic acid which comprises heating calcium formate containing sodium chloride, with an acid capable of decomposing said calcium formate before attacking said sodium chloride, and distilling off the formic acid thus obtained.

6. A method of producing formic acid which comprises treating calcium formate containing sodium chloride with sulphuric acid in such quantities that the calcium formate alone will be attacked, and separating out the formic acid produced.

7. A method of producing formic acid which comprises treating calcium formate containing sodium chloride, with sulphuric acid in a quantity sufficient to decompose the formate, but not sufficient to decompose the sodium chloride; intimately mixing the said formate and the acid to produce the desired formic acid; heating the mixture under reduced pressure and distilling off the formed formic acid.

8. A method of producing formic acid which comprises treating calcium formate containing sodium chloride, with sulphuric acid in quantity sufficient to react with all the calcium formate present, but insufficient to decompose the sodium chloride; stirring the mixture until the reaction is complete; applying a controlled amount of heat to the mass and distilling off the formic acid produced under a reduced pressure.

9. A method of producing formic acid which comprises treating 200 parts of a mixture containing 60 parts calcium formate, 40 parts sodium chloride, and 40 parts of formic acid, with 88 parts of 98% sulphuric acid; and kneading the mass until the desired formic acid is generated; then applying heat and distilling off the said formic acid under a partial vacuum.

10. The method of producing formic acid which consists in providing a raw material containing an alkali earth metal formate, sodium chloride; adding sulphuric acid to said raw material while stirring and cooling the same, and in quantities insufficient to liberate any substantial amounts of hydrochloric acid, but sufficient to decompose the formate present; heating the stirred mass to distill off the desired formic acid; and condensing the vapors thus formed.

GUY H. BUCHANAN.
JOHN L. OSBORNE.